(12) United States Patent
Freeman

(10) Patent No.: US 9,102,370 B2
(45) Date of Patent: Aug. 11, 2015

(54) TRACK PAD

(76) Inventor: Ernie Freeman, Rocky River, OH (US)

( * ) Notice: Subject to any disclaimer, the term of this patent is extended or adjusted under 35 U.S.C. 154(b) by 739 days.

(21) Appl. No.: 13/314,214

(22) Filed: Dec. 8, 2011

(65) Prior Publication Data

US 2013/0147263 A1 Jun. 13, 2013

(51) Int. Cl.
*B62D 55/26* (2006.01)
*B62D 55/075* (2006.01)
*B62D 55/28* (2006.01)

(52) U.S. Cl.
CPC .............. *B62D 55/075* (2013.01); *B62D 55/28* (2013.01)

(58) Field of Classification Search
CPC ......... B62D 55/20; B62D 55/26; B62D 55/28
USPC ......... 305/185, 187, 191, 192, 196, 198, 200, 305/201
See application file for complete search history.

(56) References Cited

U.S. PATENT DOCUMENTS

| | | | |
|---|---|---|---|
| 1,432,975 A | 10/1922 | Florin | |
| 1,453,872 A | 5/1923 | Hawkins et al. | |
| 1,455,490 A | 5/1923 | Holt | |
| 1,567,465 A | 12/1925 | Ribisi | |
| 1,629,768 A | 5/1927 | Weeks | |
| 1,832,926 A | 11/1931 | Edstedt | |
| 2,866,667 A | 12/1958 | Ratkowski | |
| 2,964,361 A * | 12/1960 | Hansen | 305/191 |
| 2,999,723 A | 9/1961 | Ostberg et al. | |
| 3,355,224 A | 11/1967 | Skanes | |
| 3,477,768 A | 11/1969 | Culver | |
| 3,687,023 A | 8/1972 | Moser et al. | |
| 3,717,387 A | 2/1973 | Cackley et al. | |
| 3,823,983 A | 7/1974 | Peterson | |
| 3,891,341 A | 6/1975 | Trainor et al. | |
| 3,976,337 A | 8/1976 | Vaughn | |
| 4,043,610 A | 8/1977 | Halmosi et al. | |
| 4,185,877 A | 1/1980 | Tanoue et al. | |
| 4,222,616 A * | 9/1980 | Brewer | 305/187 |
| 4,359,248 A | 11/1982 | Kortering | |
| 4,600,246 A | 7/1986 | Bentz | |
| 4,668,122 A | 5/1987 | Riddle | |
| 4,750,792 A | 6/1988 | Caron et al. | |
| 4,865,400 A * | 9/1989 | Caron et al. | 305/114 |
| D376,996 S | 12/1996 | Soucy et al. | |
| D451,523 S | 12/2001 | Bonko | |

(Continued)

FOREIGN PATENT DOCUMENTS

JP        09-226645 A       9/1997

OTHER PUBLICATIONS

International Search Report and Written Opinion dated Mar. 14, 2013 of PCT/US2012/066712, filed Nov. 28, 2012.

*Primary Examiner* — S. Joseph Morano
*Assistant Examiner* — Jean Charleston
(74) *Attorney, Agent, or Firm* — Pearne & Gordon LLP

(57) ABSTRACT

A track pad for a crawler, especially operating in a landfill, having a generally rectangular base plate with holes for attachment to a track chain link, the base plate having front, rear and side edges, a high rise grouser on the base plate, the grouser projecting from the base plate a distance substantially greater than conventional grousers, the grouser having a central portion with the general configuration of a plate with an edge distal from the base plate, the central portion being generally laterally centered on the base plate, the grouser being devoid of areas projecting significantly from the base plate adjacent the side edges of the base plate.

12 Claims, 3 Drawing Sheets

(56) References Cited

U.S. PATENT DOCUMENTS

| | | |
|---|---|---|
| 7,066,562 B2 | 6/2006 | Rasmussen |
| 7,198,333 B1 | 4/2007 | Freeman |
| D565,605 S | 4/2008 | Tateishi |
| D567,823 S | 4/2008 | Hagio |
| D617,817 S | 6/2010 | Brockway |
| D637,626 S | 5/2011 | Vladimirovich |
| 2002/0079738 A1* | 6/2002 | Doyle ............................ 305/185 |
| 2004/0140717 A1* | 7/2004 | McNutt et al. ................. 305/187 |
| 2005/0253454 A1 | 11/2005 | Rasmussen |
| 2010/0225160 A1 | 9/2010 | Rainer et al. |

* cited by examiner

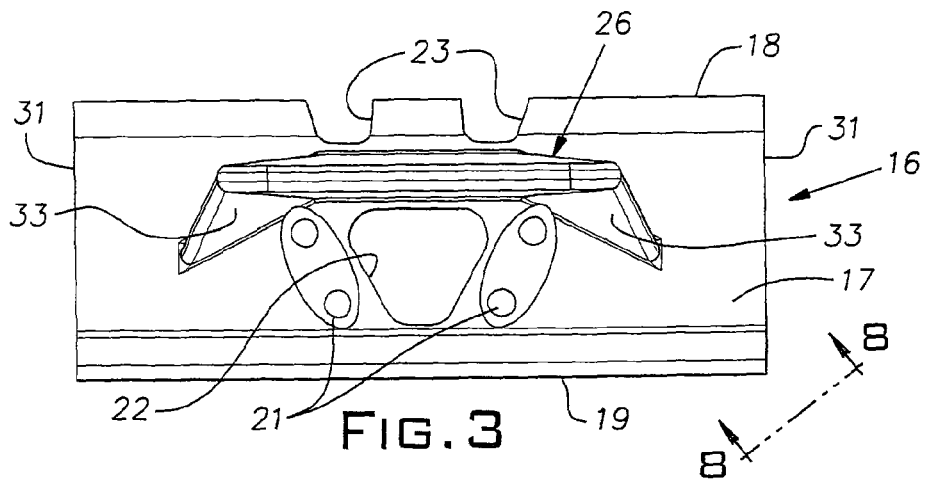
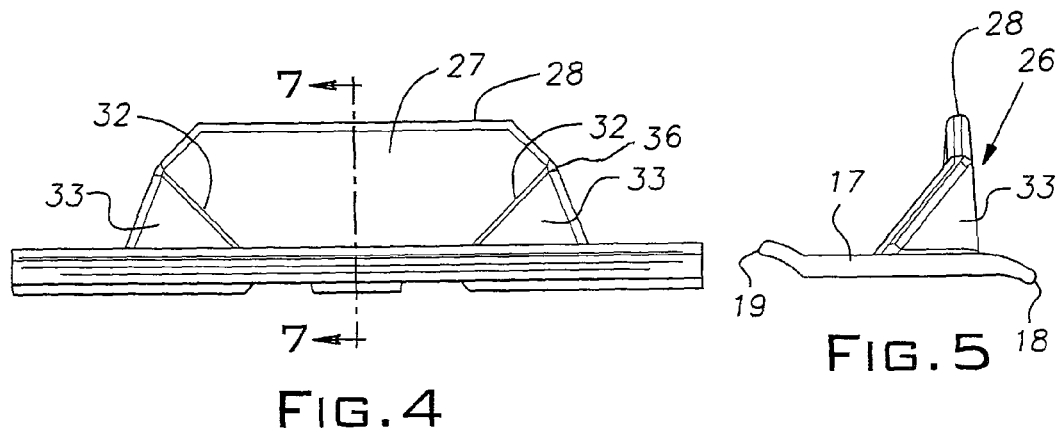
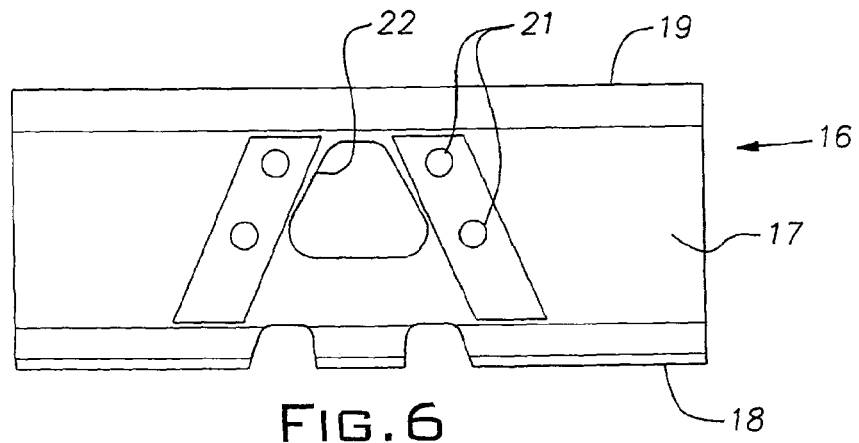

TRACK PAD

BACKGROUND OF THE INVENTION

The invention relates to improvements in tracks for crawler machines and, in particular to an improved track pad for bulldozers operating in landfills and other difficult terrain.

PRIOR ART

Crawler or track machines are commonly embodied as bulldozers with a front blade used to push material and/or establish a grade. These machines are used in landfills for dozing and compacting debris and for grading cover material. The surface of a landfill can be difficult to cross or climb with any land vehicle including a crawler since the surface typically comprises loose non-cohesive material of widely diverse physical characteristics. Landfill materials are notoriously destructive to the external rotating and sliding parts of a vehicle's propulsion system.

In a crawler or track machine, debris can wrap around or otherwise develop a drag on moving parts ultimately causing destruction of these parts and/or related seals and bearings. Strands of material are frequently entrained with conventional track pads resulting in a relatively fast and severe build-up of debris in the roller frames of the machine. Progressive packing of debris into a roller frame can create severe abrasion of the track area, stretching of the track chain and excessive wear in the drive train.

SUMMARY OF THE INVENTION

The invention provides a track pad for a crawler with a unique grouser construction that, surprisingly, reduces or delays destructive build-up of debris in a crawler roller frame when operating in a landfill environment. Additionally, the track pad of the invention advantageously improves traction, compaction, and lateral stability or grip.

The grouser configuration of the invention is characterized by an exceptionally high rise and ends effectively spaced from the lateral edges of the track pad.

The reason or reasons for the surprising ability of the track pad to reduce fouling of the roller frames is not fully understood. It is believed that the laterally inward spacing of the grouser, possibly in combination with its high rise and/or oblique side portion gussets, reduces the tendency of strand material to be dragged up from the surface onto the upper region of the track. Strand material carried up and around a sprocket or idler appears to have an increased tendency to become entangled in a roller frame.

In addition to reducing the rate of debris build-up when operating in a landfill, the track pads greatly improve the lateral stability of a tractor enabling it to traverse slopes in directions perpendicular or with a vector component perpendicular to the slope direction. The track pads do not adversely affect the mobility of a crawler and their configuration avoids eccentric loading of the track guides.

BRIEF DESCRIPTION OF THE DRAWINGS

FIG. 3 is a top view of a track pad of the invention;

FIG. 4 is a rear view of the track pad;

FIG. 5 is a side view of the track pad;

FIG. 6 is a bottom view of the track pad;

DESCRIPTION OF THE PREFERRED EMBODIMENT

Figure 1:
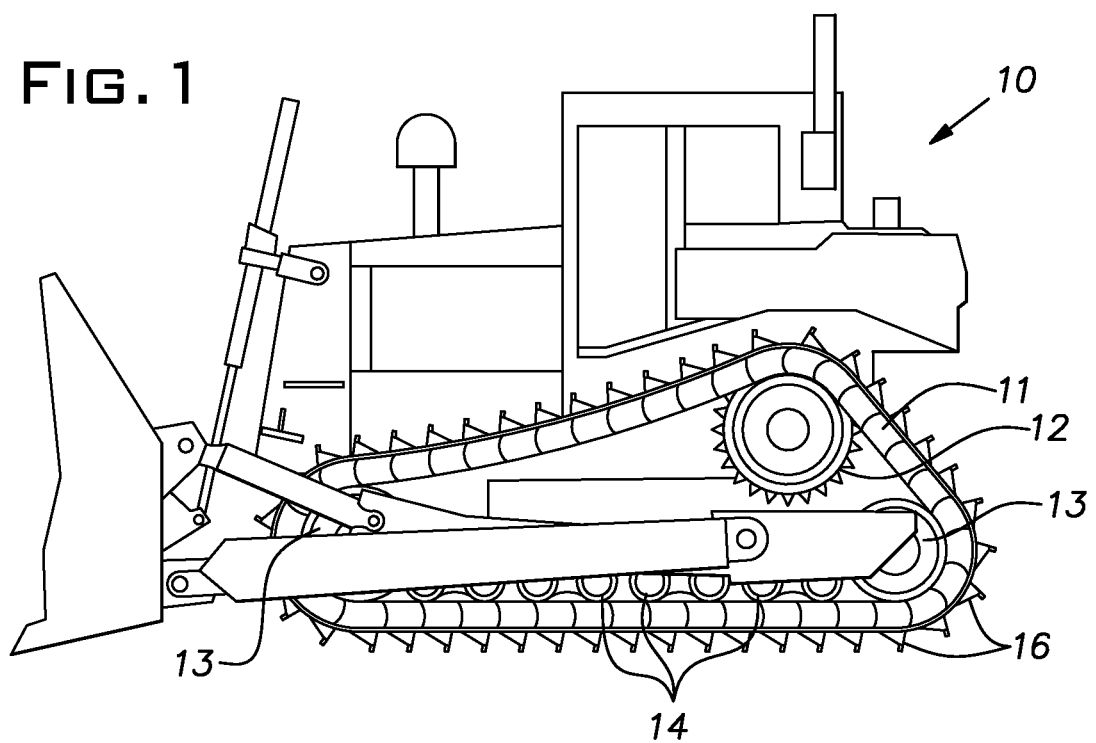
FIG. 1 is a side view of a bulldozer on which the track pads of the invention are installed.
Figure 2:
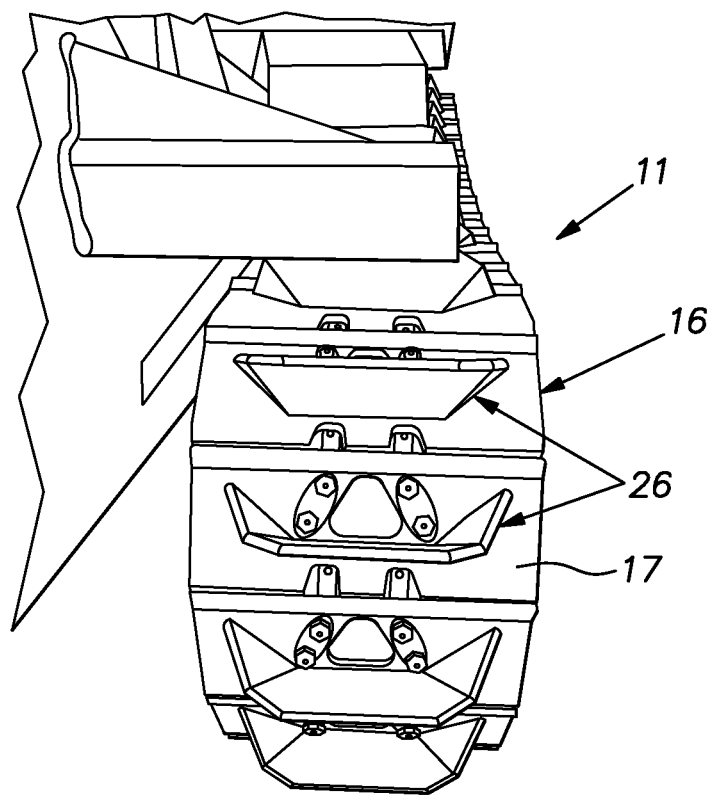
FIG. 2 is a front view of a left track of the machine of FIG. 1.
Figure 7:
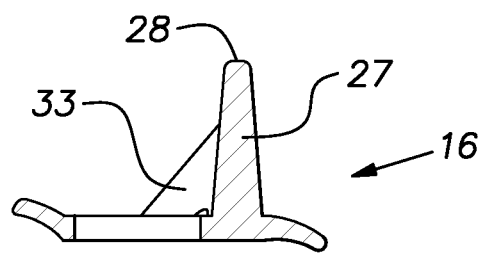
FIG. 7 is a cross-sectional view of the track pad taken in the plane 7-7 in FIG. 4.
Figure 8:
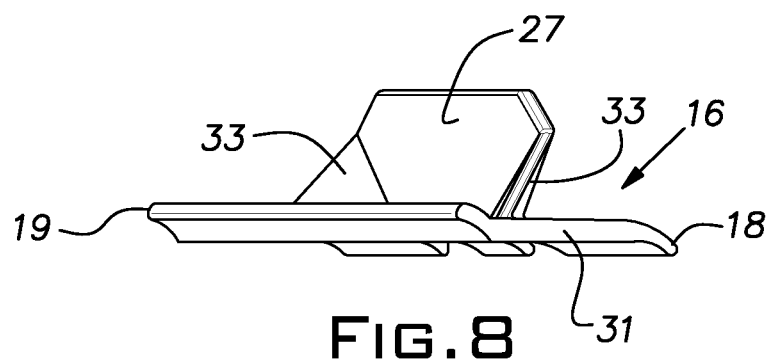
FIG. 8 is an elevational view of the track pad taken at the plane indicated at 8-8 in FIG. 3.

FIG. 1 illustrates a typical crawler or track machine 10; specifically, the machine illustrated is a model D8R "High Drive" design manufactured by Caterpillar, Inc. It will be understood that the invention is applicable to essentially any track machine, for example, of different size, design, purpose and/or manufacturer. The machine 10 is supported by and carried by an endless track 11 on each side. Each track 11 is trained around a drive sprocket 12 and idlers 13. A lower reach of the track 11 underlies a series of rollers 14 which reduce friction during movement of the track.

Typically, the track 11 comprises steel links pivotally joined together with pins and steel pads or shoes 16. Customarily, each link has an associated pad 16 bolted to it. The tracks 11, sprockets 12, idlers 13, rollers 14 and related structures are collectively referred to as the roller frames. Conventionally, the track pads 16 are identical to one another. In FIGS. 3-8, the track pad 16 of the invention is drawn to scale.

Referring now more specifically to the invention, a track pad 16 has a generally planar base plate 17. The base 17 in the plan view of FIG. 3 is generally rectangular. A forward or lead edge 18, with reference to the direction of travel of the track 11 when the machine 10 is travelling in the forward direction, is turned down while a rearward edge 19 is turned up. This down and up geometry permits the adjacent track pads 16 to overlap at their edges. A set of holes 21 in the pad base 17 align with holes in a track chain link to permit the track pad 16 to be fastened with bolts to the link. A triangular hole 22 allows debris and/or mud to pass out of a link to avoid trapping of the same. Cutouts 23 in the forward or lead edge 18 avoid interference with the associated track link.

The inventive track pad 16 is characterized by a distinctly configured grouser 26. The grouser 26 has a "high rise" central portion 27 lying in a plane generally perpendicular to the main part of the pad base 17. In the illustrated case, the opposite faces of the central portion 27 each have a draft angle of about 95 degrees. The central portion or section 27 represents the part of the grouser 26 having the greatest rise above the plane of the base 17. The rise or projection of the central portion 27 from the base 17 is preferably a substantial fraction of the length of the track pad (measured from forward edge 18 to rearward edge 19) and, preferably, is at least one-half of this length. If measured to include the thickness of the base 17, the height of the illustrated central portion 27 is greater than one-half the length of the track pad 16.

The grouser central portion 27 is laterally truncated such that its lateral edges are spaced inwardly from the lateral edges, designated 31, of the track pad 16 a distance substantially equal to or more than its height, measured from the top of the base 17. Lateral margins 32 of the central portion 27 are each supported by an associated side portion or gusset 33. Each side portion 33 lies in a nominal plane that intersects the plane of the base at an angle of about 117° (FIG. 8) and at the surface of the base 17 lies along a line that recedes at an angle of about 27° (FIG. 3) with reference to the plane of the central portion 27. Thus, the side portions 33 are canted so that as they project from the base 17 they tilt laterally outward and forward with respect to the direction of travel of the track when the machine 10 is moving in a forward direction.

As shown, for example, in FIG. 4, the central portion or section 27 of the grouser 26 is wider at its distal edge 28 than at its base where it joins the pad base 17. The illustrated distal edge 28 is in a plane parallel to the base 17. The track pad 16 is conveniently manufactured by casting or forging as a unitary piece of steel. Further, the grouser central portion 27 and side portions 33 are spaced laterally inward of the lateral edges 31 of the base 17. As shown in FIG. 4, any outside corners 36 of the combined peripheral edge of the central portion 27 and the side portions 33 are distal from the main pad or base plate 17 and viewed in a vertical plane are obtuse so as to avoid sharp corners.

In a landfill environment, the track pad 16 with the grouser 26 has demonstrated improved traction, enabling a machine to more easily climb steep grades. Still further, the grouser equipped track pad 16 affords much greater sideways stability than has been available with conventional track pads. Most surprisingly, the grouser 26 has demonstrated a unique ability when operating in a landfill to retard the build-up of debris in the roller frames. Typically, debris is drawn into and entangled in the roller frame by strands of material that are picked up by a conventional track pad grouser design and then find their way into the roller frame. The mechanics involved in the operation of the grouser 26 of the invention are not entirely understood, particularly as they relate to a reduction in the rate of debris build-up in the roller frame. It may be that the high rise of the grouser has a greater tendency to throw-off material strands than a lower rise grouser. Additionally, the truncated arrangement where the high rise part of the grouser is laterally spaced a considerable distance from the side edges of the track pad base appears to be beneficial in the ability of the track pad to refrain from picking up strands of material.

In the illustrated embodiment, the central portion 27 of the grouser 26 rises over 5" from the bottom of the track pad base 17. While a grouser height of about 5" is presently preferred, some range in this height is practical although it is believed that a grouser height of at least 4" is necessary to get most of the benefits of the invention. In the disclosed embodiment, all parts of the grouser 26 project from the base 17 no more than their lateral spacing from the adjacent lateral edge 31. It is believed, however, in alternative arrangements of the invention, that a relatively short grouser projection of say 1" at the edge 31 and a rise of intermediate grouser parts not more than 1" plus the lateral spacing from the adjacent edge would produce some of the benefits of the invention.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A track pad for a crawler having a generally rectangular base plate with holes for attachment to a track chain link, the base plate having front, rear and side edges, a high rise grouser on the base plate, the grouser projecting from the base plate a distance substantially equal to at least one-half the distance between the front and rear edges of the base plate, the grouser having a central portion with the general configuration of a plate with an edge distal from the base plate, the central portion being generally laterally centered on the base plate, the grouser having side portions that gradually reduce in height above the base plate with decreasing distance from the base plate side edges, any outside corners of the combined peripheral edge of the central portion and the side portions distal from the base plate and viewed in a vertical plane being obtuse so as to avoid sharp corners such that the central portion and the side portions avoid debris build-up causing projections adjacent the base plate side edges.

2. A track pad as set forth in claim 1, wherein the grouser locally projects a vertical distance from the base plate not more than one inch plus a horizontal distance from an adjacent side of the base plate.

3. A track pad as set forth in claim 1, wherein the grouser side portions lie in respective planes oblique to the central portion.

4. A track pad for a crawler having a generally rectangular base plate with holes for attachment to a track chain link, the base plate having front, rear and side edges, a high rise grouser on the base plate, the grouser projecting from the base plate a distance substantially equal to at least one-half the distance between the front and rear edges of the base plate, the grouser having a central portion with the general configuration of a plate with an edge distal from the base plate, the central portion being generally laterally centered on the base plate, the grouser including side portions on each side of the central portion, the side portions lying in respective planes oblique to the central portion, the side portions being triangular gusset shapes projecting from a surface of the base plate gradually to the level of the central portion.

5. A track pad as set forth in claim 4, wherein said side portions are in laterally outwardly directed planes oblique to the base plate.

6. A track pad as set forth in claim 1, wherein the grouser projects vertically from the base plate a distance not greater than a projecting area of the grouser is spaced from an adjacent edge of the base plate.

7. A track pad for a crawler having a generally rectangular base plate with holes for attachment to a track chain link, the base plate having front, rear and side edges, a high rise grouser on the base plate, the grouser projecting from the base plate a distance at least four inches above the bottom of the base plate, the grouser having a central portion with the general configuration of a plate with an edge distal from the base plate, the central portion being generally laterally centered on the base plate, the grouser having side portions that reduce in height above the base plate with decreasing distance from the base plate side edges, any outside corners of the combined peripheral edge of the central portion and the side portions distal from the base plate and viewed in a vertical plane being obtuse so as to avoid sharp corners such that the central portion and the side portions avoid debris build-up causing projections adjacent the base plate side edges.

8. A method of retarding the build-up of debris in the roller frame of a crawler when operating in a landfill comprising using track pads having a grouser projecting from the main pad body a distance of at least four inches at a central portion and at side portions projecting less than one inch adjacent the side edges of the main pad body, any outside corners of the combined peripheral edge of the central portion and the side portions distal from the base plate and viewed in a vertical plane being obtuse so as to avoid sharp corners.

9. A method as set forth in claim 8, wherein the central portion of the grouser is reinforced with the side portions obliquely oriented to the central portion.

10. A method of retarding the build-up of debris in the roller frame of a crawler when operating in a landfill comprising using track pads having a grouser projecting from the main pad body a distance of at least four inches and projecting less than one inch adjacent the side edges of the main pad body, a central portion of the grouser being reinforced with gusset portions obliquely oriented to the central portion, the gusset portions being triangular in profile and being arranged obliquely to the main pad body.

11. A method as set forth in claim 10, wherein the gusset portions are arranged to trail the central portion of the grouser.

12. A method of retarding the build-up of debris in the roller frame of a crawler when operating in a landfill comprising using track pads having a grouser projecting from the main pad body a distance of at least four inches and projecting less than one inch adjacent the side edges of the main pad body, a central portion of the grouser being reinforced with gusset portions obliquely oriented to the central portion, the gusset portions being triangular in profile.

* * * * *